US012775991B2

(12) United States Patent
Xu

(10) Patent No.: US 12,775,991 B2
(45) Date of Patent: Oct. 27, 2026

(54) ELECTRONIC IDENTIFICATION CARD AND ELECTRONIC IDENTIFICATION SYSTEM

(71) Applicant: E Ink Holdings Inc., Hsinchu (TW)

(72) Inventor: Jia Hong Xu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 23 days.

(21) Appl. No.: 18/636,229

(22) Filed: Apr. 15, 2024

(65) Prior Publication Data

US 2024/0420266 A1 Dec. 19, 2024

(30) Foreign Application Priority Data

Jun. 19, 2023 (TW) ................................ 112122871

(51) Int. Cl.
*G06Q 50/26* (2024.01)
*G06F 21/33* (2013.01)

(52) U.S. Cl.
CPC .......... *G06Q 50/265* (2013.01); *G06F 21/33* (2013.01)

(58) Field of Classification Search
None
See application file for complete search history.

(56) References Cited

U.S. PATENT DOCUMENTS

| | | | | |
|---|---|---|---|---|
| 8,201,214 | B1 * | 6/2012 | Wallace | G06F 21/33 726/28 |
| 10,147,086 | B2 | 12/2018 | Teuwen et al. | |
| 11,416,727 | B1 | 8/2022 | Fletcher et al. | |
| 2011/0165859 | A1 * | 7/2011 | Wengrovitz | H04L 67/55 455/414.1 |
| 2012/0138679 | A1 | 6/2012 | Doyle | |
| 2014/0087656 | A1 * | 3/2014 | Boelter | G06F 21/84 345/647 |
| 2014/0181955 | A1 * | 6/2014 | Rosati | G06F 21/35 726/18 |
| 2016/0188943 | A1 * | 6/2016 | Franz | G06K 7/10831 235/462.2 |
| 2018/0121727 | A1 * | 5/2018 | Yin | G06F 3/011 |
| 2018/0288037 | A1 * | 10/2018 | Yang | G06F 21/35 |

FOREIGN PATENT DOCUMENTS

| | | | | |
|---|---|---|---|---|
| CN | 110620780 | A | | 12/2019 |
| EP | 1894137 | B1 | | 3/2014 |
| TW | 201337775 | A | * | 9/2013 |
| TW | 201837781 | A | | 10/2018 |

OTHER PUBLICATIONS

Battery E-Paper NFC Smart ID Badge, Youtube.com, available at: < https://www.youtube.com/watch?v =-bl3HMjeQOk > Uploaded May 29, 2023. (Year: 2023).*

* cited by examiner

*Primary Examiner* — Richard W. Crandall
(74) *Attorney, Agent, or Firm* — CKC & Partners Co., LLC

(57) ABSTRACT

An electronic identification card is provided and includes an e-paper display, a security chip, and a processing circuit. The processing circuit receives a modification request from an electronic device and performs an authentication process. If the authentication process is passed, the security chip transmits identity information to the electronic device in which the identity information contains multiple items. The processing circuit also receives edited information from the electronic device, based on which it decides at least one item to be displayed among the aforementioned items, generates a barcode according to the item to be displayed, and controls the e-paper display to show the barcode.

15 Claims, 5 Drawing Sheets

ELECTRONIC IDENTIFICATION CARD AND ELECTRONIC IDENTIFICATION SYSTEM

RELATED APPLICATIONS

This application claims priority to Taiwan Application Serial Number 112122871 filed Jun. 19, 2023, which is herein incorporated by reference.

BACKGROUND

Field of Invention

The present disclosure relates to an electronic identification card and an electronic identification system capable of editing displayed identity information.

Description of Related Art

Conventional identification cards or other cards of proving one's identity directly display identity information on the surface of the card, and the level of detail included in the displayed identity information cannot be controlled. In the current era of information explosion and increasing emphasis on personal privacy, displaying excessively detailed identity information raises concerns among some people.

SUMMARY

Embodiments of the present disclosure provide an electronic identification card including an e-paper display, a security chip, and a processing circuit. The processing circuit is electrically connected to the e-paper display and the security chip, and configured to receive a modification request from an electronic device and perform an authentication process. If the authentication process is passed, the security chip is configured to transmit identity information to the electronic device, in which the identity information includes items. The processing circuit is configured to receive edited information from the electronic device, determine at least one item to be displayed among the items according to the edited information, generate a barcode according to the item to be displayed, and control the e-paper display to display the barcode.

In some embodiments, the authentication process includes: transmitting, by the security chip, a certificate request message to the electronic device; transmitting, by the electronic device, a certificate to the security chip; and determining, by the security chip, if the certificate is correct, determining that the authentication process is passed if yes, and otherwise determining that the authentication process is not passed.

In some embodiments, the barcode is configured to be scanned by a reading device to display an augmented reality object which includes the item to be displayed.

In some embodiments, the items include name, address, identification number, or date of birth.

In some embodiments, the security chip includes a near field communication circuit.

From another aspect, embodiments of the present disclosure provide an electronic identification system including an electronic device and the aforementioned electronic identification card including an e-paper display, a security chip, and a processing circuit. The processing circuit is electrically connected to the e-paper display and the security chip, and configured to receive a modification request from the electronic device and perform an authentication process. If the authentication process is passed, the security chip is configured to transmit identity information to the electronic device, in which the identity information includes items. The electronic device is configured to select at least one of the items to generate edited information, and transmit the edited information to the processing circuit. The processing circuit is configured to determine at least one item to be displayed among the items according to the edited information, generate a barcode according to the item to be displayed, and control the e-paper display to display the barcode.

From another aspect, embodiments of the present disclosure provide a method for an electronic identification card. The method includes: receiving, by a processing circuit, a modification request from an electronic device and performing an authentication process; if the authentication process is passed, transmitting, by a security chip, identity information to the electronic device, in which the identity information includes items; selecting, by the electronic device, at least one of the items to generate edited information, and transmitting the edited information to the processing circuit; and determining, by the processing circuit, at least one item to be displayed among the items according to the edited information, generating a barcode according to the item to be displayed, and controlling an e-paper display to display the barcode.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
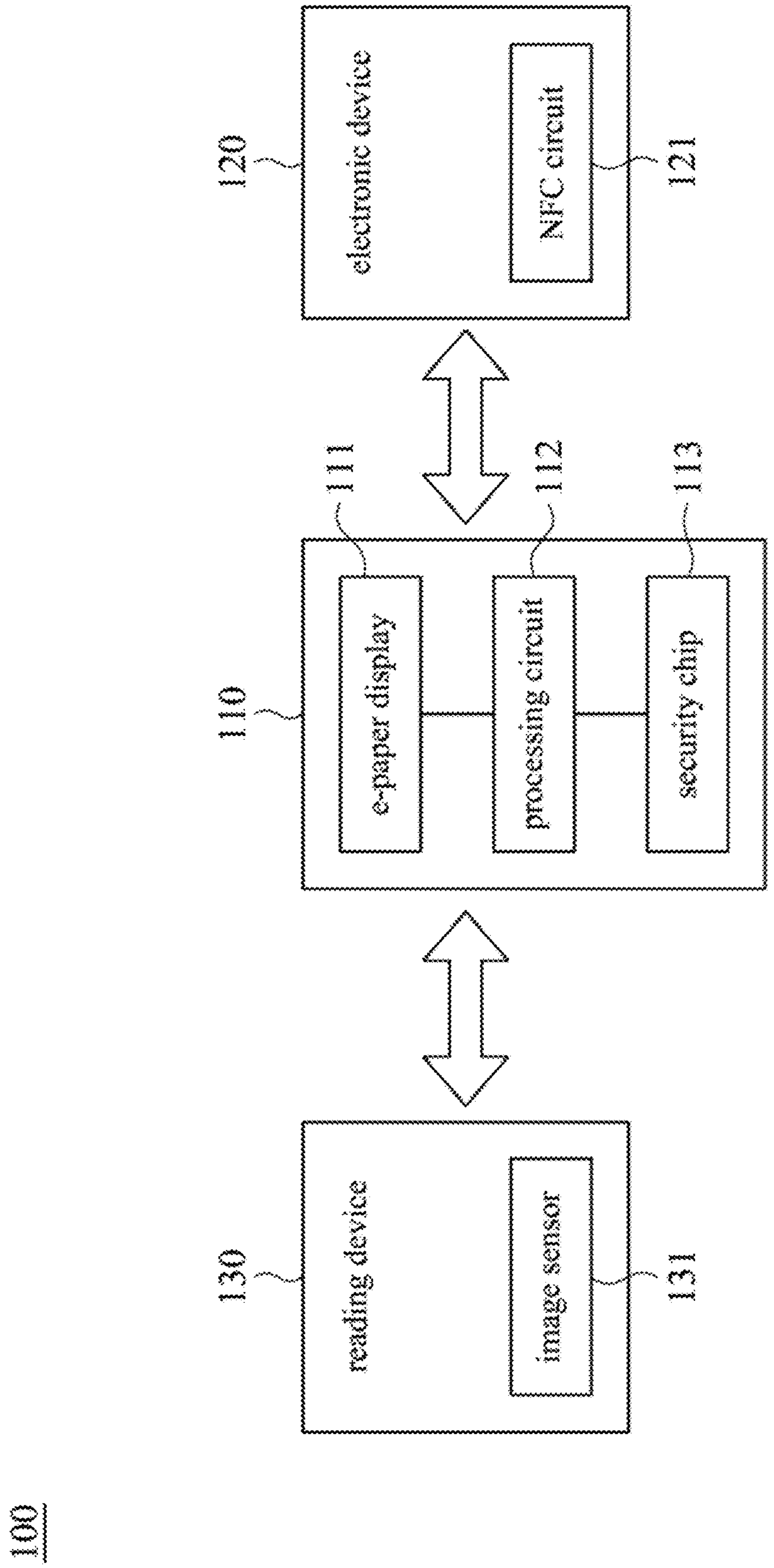
FIG. 1 is a schematic diagram illustrating an electronic identification system according to one embodiment.

FIG. 1 is a schematic diagram illustrating an electronic identification system according to one embodiment. Referring to FIG. 1, an electronic identification system 100 includes an electronic identification card 110, an electronic device 120, and a reading device 130. The electronic identification card 110 includes an e-paper display 111, a processing circuit 112, and a security chip 113. The appearance of the electronic identification card 110 can be a card, but the disclosure is not limited to this.

The e-paper display (electronic paper display (EPD)) 111 uses a large number of microcapsules, which serve as e-ink and can display electronic content on a plastic film as if they were optical components. The clear solution inside each microcapsule not only contains positively charged white particles and negatively charged black particles, but can also contain particles of other colors, such as red, green, and blue particles with different polar charges, in order to achieve full-color display. When an appropriate electric field is applied, the corresponding particles will move to the top of the microcapsule, allowing the user to see these particles, resulting in the display panel presenting different color display results.

The processing circuit 112 can be a microcontroller, microprocessor, or an application-specific integrated circuit, among others. The security chip 113 may include a near field communication (NFC) circuit, which can implement near field communication functions, such as data exchange with other NFC devices or interaction with an NFC reader. The security chip 113 stores the user's identity information. This identity information is pre-written into the security chip 113 and can include multiple items such as name, address, identification number, date of birthday, spouse's name, parents' names. To enhance security, the security chip 113 can also integrate biometric technologies, such as fingerprint recognition or facial recognition, to further protect the identity information. In some embodiments, the electronic identification card 110 does not require a battery.

The electronic device 120 can be a smartphone, a tablet computer, etc. The electronic device 120 may include a processor, memory, touch display screen, NFC circuit, and so forth. For simplicity, only a NFC circuit 121 is shown in FIG. 1. The electronic device 120 communicates and provides power to the electronic identification card 110 via the NFC circuit 121 connected to the security chip 113. The reading device 130 can be a smartphone, tablet computer, NFC reader, etc. In this embodiment, the reading device 130 may include a processor, memory, image sensor, NFC circuit, etc. For simplicity, only an image sensor 131 is shown in FIG. 1.

Figure 2:
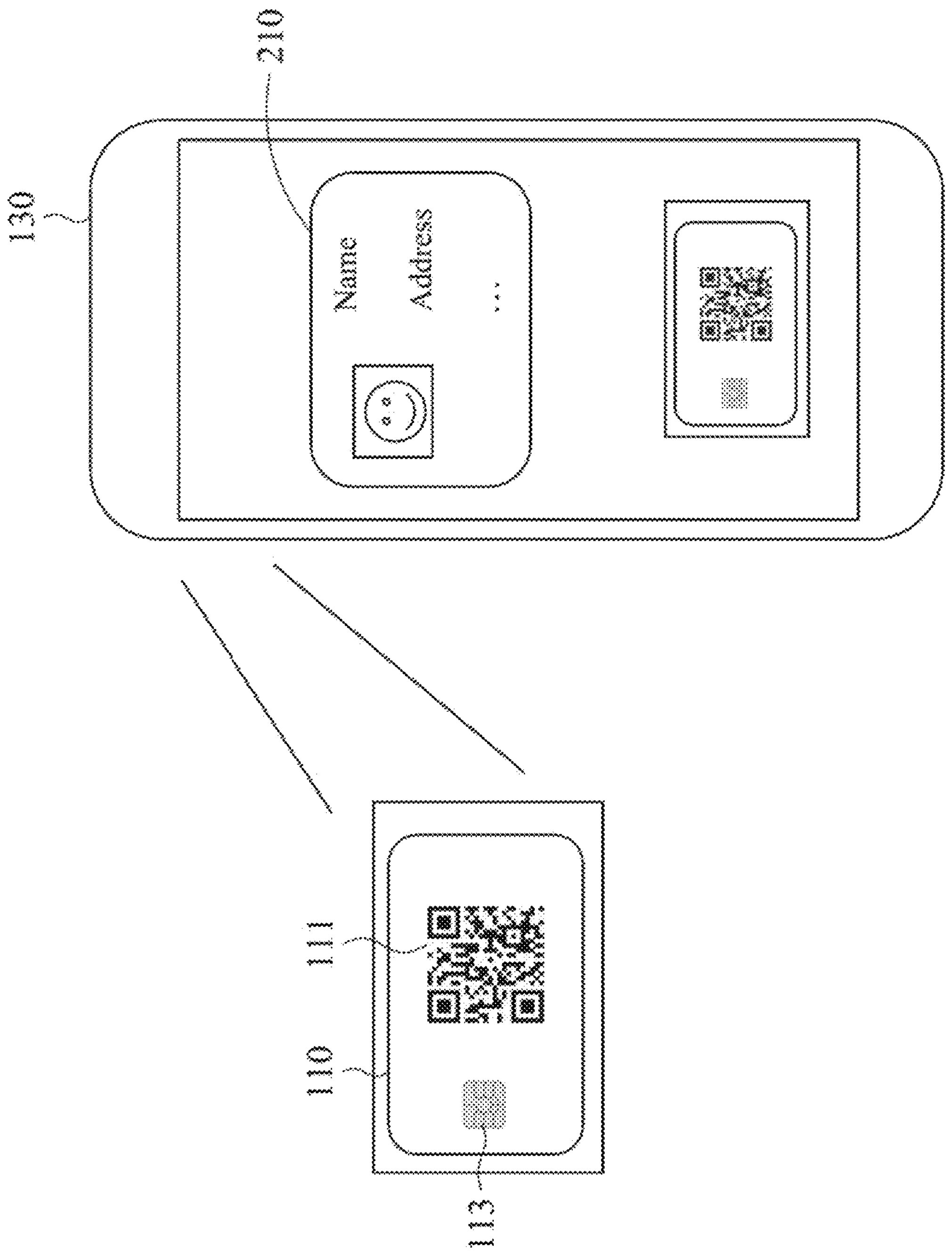
FIG. 2 is a schematic diagram illustrating the use of AR technology combined with an e-paper display to display identity information according to one embodiment.

The e-paper display 111 is used to display a barcode, which can be a one-dimensional barcode or a two-dimensional barcode, but the disclosure is not limited to this. The reading device 130 can display the content of the barcode using augmented reality (AR) technology. FIG. 2 is a schematic diagram illustrating the use of AR technology combined with an e-paper display to display identity information according to one embodiment. Referring to FIG. 2, the reading device 130 scans the barcode displayed on the e-paper display 111 via its own image sensor, and displays an augmented reality object 210 on its screen through AR technology. This augmented reality object 210 may be, for example, a virtual ID card displaying the user's name, address, etc. In this way, these identity information items are not directly displayed on the e-paper display 111, which can protect the user's privacy. Additionally, the e-paper display 111 does not consume power when maintaining the same image, which is a characteristic suitable for the battery-free electronic identification card 110.

The system and electronic identification card proposed in this disclosure have at least two usage scenarios. In the first scenario, the electronic device 120 can decide what content to display on the augmented reality object 210, such as displaying only the name but not the parents' names, etc. The user can select one or more items to be displayed, but cannot change the content of these items. In the second scenario, the reading device 130 can read detailed and complete identity information from the electronic identification card 110. We will discuss the first scenario in the following paragraph.

Figure 3:
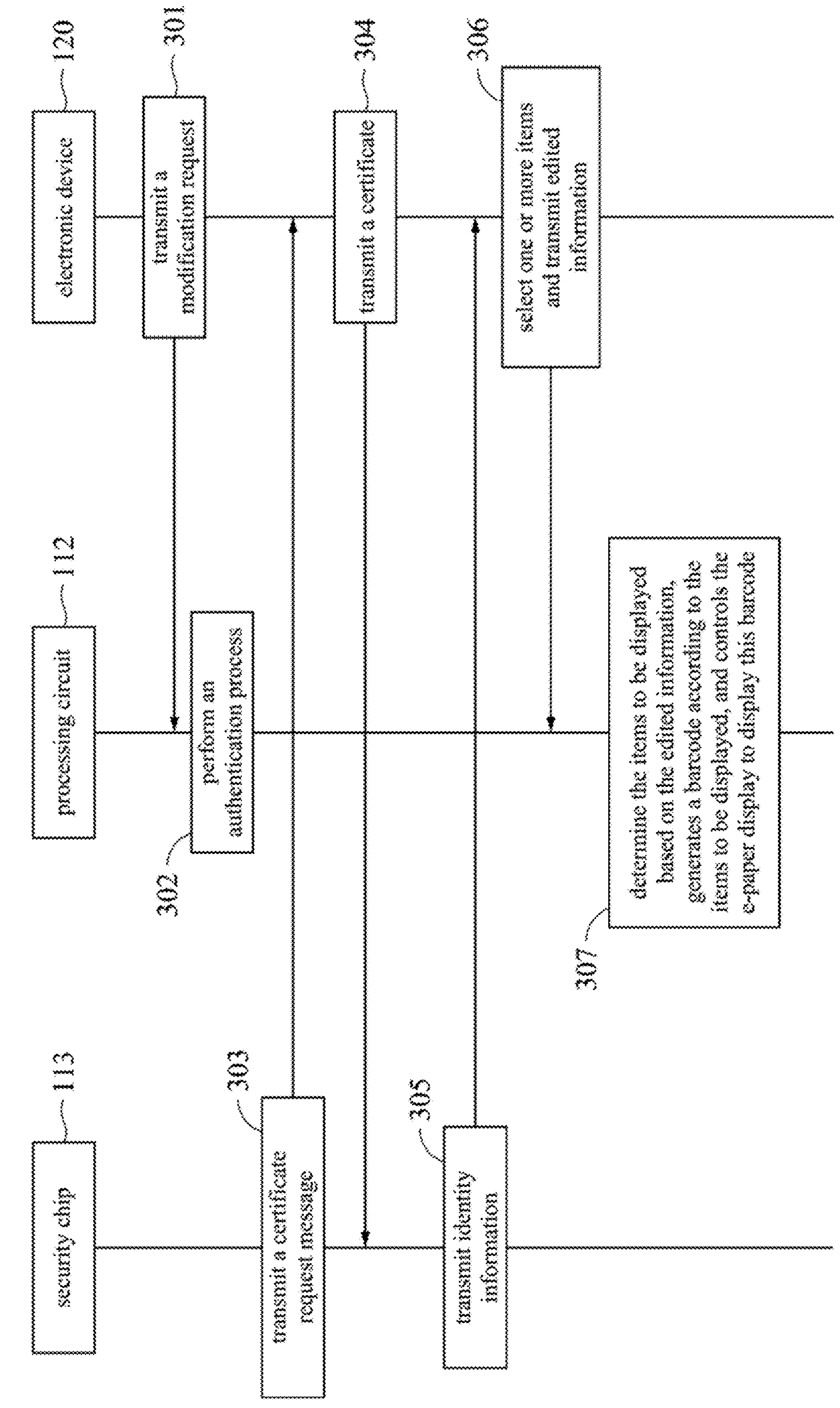
FIG. 3 is a flowchart illustrating a flowchart of a method for editing the content displayed on the augmented reality object, according to one embodiment.

FIG. 3 is a flowchart illustrating a flowchart of a method for editing the content displayed on the augmented reality object, according to one embodiment. Referring to FIG. 3, in step 301, the electronic device 120 transmits a modification request to the processing circuit 112. In step 302, the processing circuit 112 receives the modification request from the electronic device 120 and drives the security chip 113 to perform an authentication process. This authentication process is used to verify whether the electronic device 120 is a legitimate device or whether the user is legitimate, in other words, the target of the authentication process can be either the user or the device. Specifically, the authentication process includes steps 303 and 304. In the step 303, the security chip 113 transmits a certificate request message to the electronic device 120. In step 304, the electronic device 120 transmits a certificate to the security chip 113. This certificate can include a password, device identification code, biometric information, or any suitable data which is not limited in the disclosure. For example, the user can input a fingerprint through a fingerprint sensor on the electronic device 120 and transmit this fingerprint as a certificate to the security chip for determining if the user is legitimate. Alternatively, the electronic device 120 can also transmit the device identification code of itself to the security chip 113, and the security chip determines whether this device identification code is on a whitelist, thereby determining whether the electronic device 120 is a legitimate device. This disclosure does not limit the target of the authentication process to either the user or the device. Regardless of the approach, the security chip 113 will determine whether the received certificate is correct. If it is correct, it is determined to have passed the authentication process; otherwise, it has not passed the authentication process.

Figure 4:
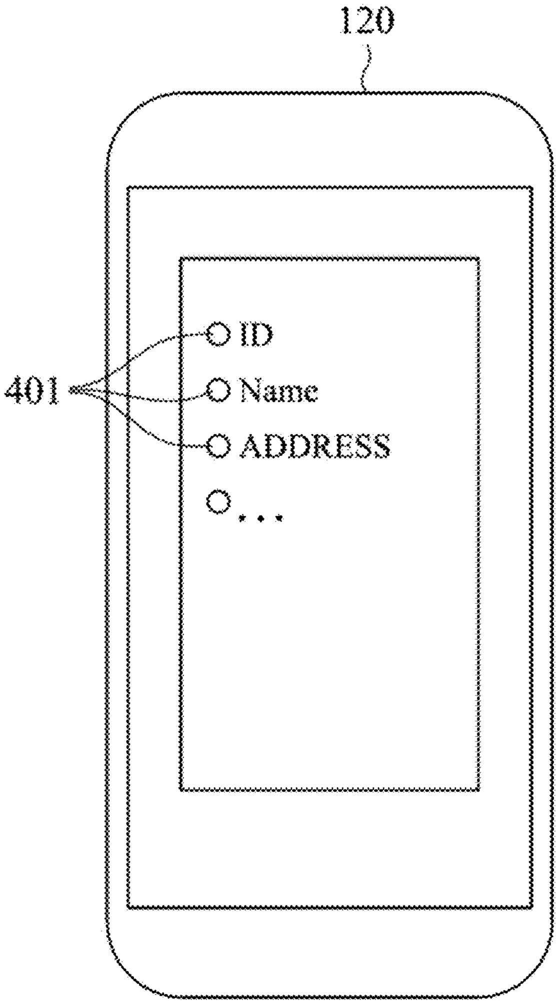
FIG. 4 is a schematic diagram illustrating a user interface according to one embodiment.

If the security chip 113 determines that the authentication process is not passed, it will not have any other response, or it can transmit an error message to the processing circuit 112. If the authentication process is passed, in step 305, the security chip 113 transmits identity information to the electronic device 120. In step 306, the electronic device 120 provides a user interface allowing the user to select one or more items from multiple items. For example, FIG. 4 is a schematic diagram illustrating a user interface according to one embodiment. Multiple items 401 are displayed on the screen of the electronic device 120, and users can choose the items to be displayed by clicking on them. After the user makes a selection, the electronic device 120 generates edited information which includes the selected items (referred to as item to be displayed) and transmits this edited information to the processing circuit 112. In step 307, the processing circuit 112 determines the items to be displayed based on the edited information, generates a barcode according to the items to be displayed, and controls the e-paper display 111 to display this barcode. In this way, when the reading device 130 scans this barcode and displays the augmented reality object, this augmented reality object will only include the items to be displayed, but will not include the unselected items. Through the process shown in FIG. 3, users can freely choose the identity information to display, thus protecting personal privacy.

Figure 5:
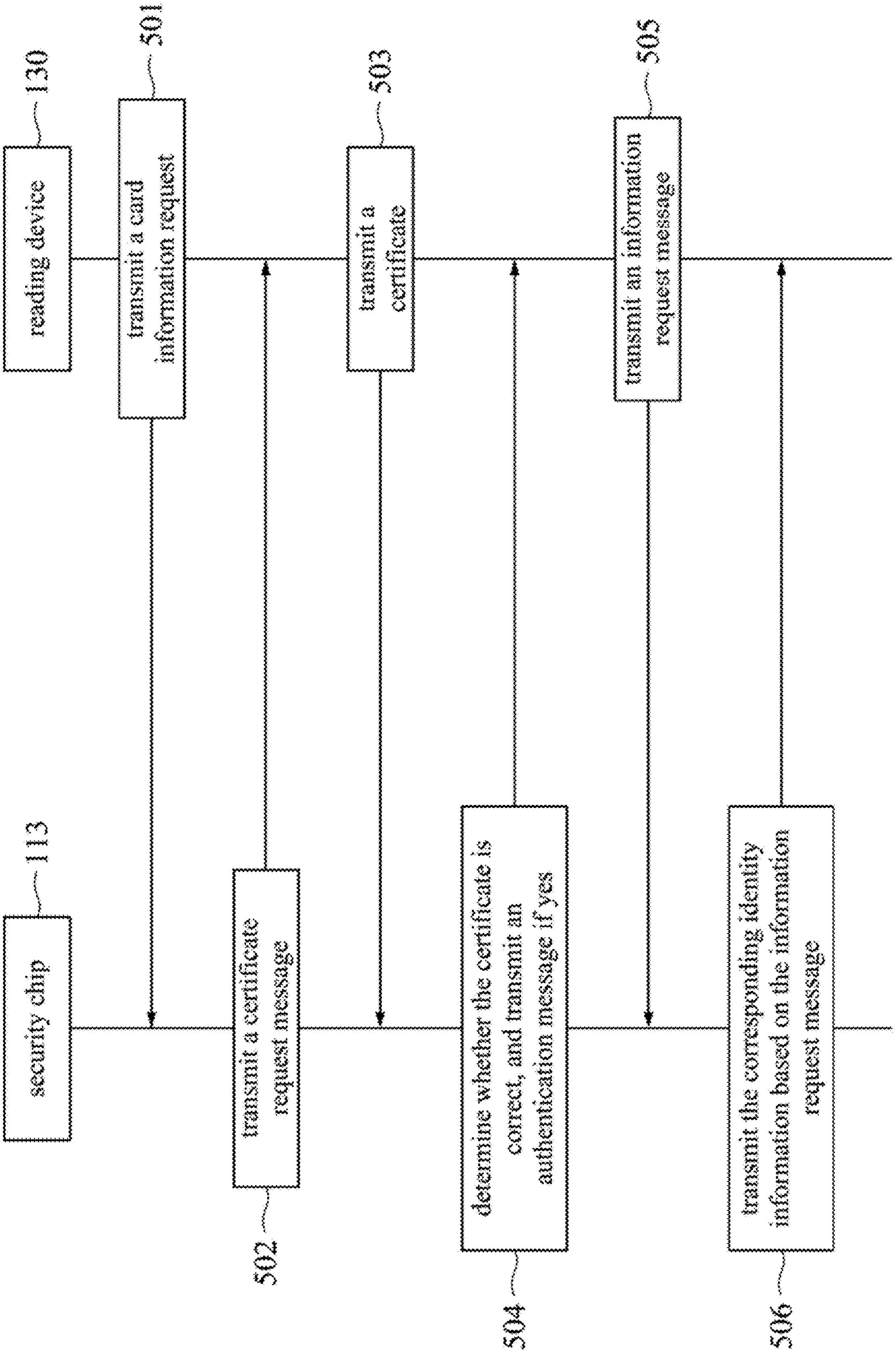
FIG. 5 is a flowchart illustrating the process of retrieving detailed information from the security chip 113 in accordance with one embodiment.

FIG. 5 is a flowchart illustrating the process of retrieving detailed information from the security chip 113 in accordance with one embodiment. In this embodiment, the reading device 130 belongs to a government agency or other trusted organization that seeks to obtain more detailed information from the security chip 113. First, the reading device 130 connects to the security chip 113 through its own NFC circuit. In step 501, the reading device 130 transmits a card information request to the security chip 113. In step 502, the security chip 113 transmits a certificate request message to the reading device 130. In step 503, the reading device 130 transmits a certificate to the security chip 113. The certificate has been explained above and will not be repeated here. In step 504, the security chip 113 determines whether the certificate is correct. If it's not, there will be no response. If the certificate is correct, in step 504, the security chip 113 will transmit an authentication message to the reading device 130. In step 505, upon receiving the authentication message, the reading device 130 transmits an information request message to the security chip 113, which may contain the identity information to be obtained. For example, if the reading device 130 belongs to a hospital or clinic, and the security chip 113 stores the user's medical records, then this information request message would be requesting these medical records. In step 506, the security chip 113 transmits the corresponding identity information to the reading device 130 based on the information request message.

In the above electronic identification card and electronic identification system, e-paper and augmented reality technologies are combined to display identity information. Furthermore, by using the appropriate electronic device, the content displayed in the augmented reality object can be edited, which can help protect individual privacy.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic identification card, comprising:

an e-paper display;

a security chip; and a processing circuit, electrically connected to the e-paper display and the security chip, and configured to receive a modification request from an electronic device and perform an authentication process, if the authentication process is passed, the security chip is configured to transmit identity information to the electronic device, wherein the identity information comprises a plurality of items, wherein in response to receiving the identity information, the electronic device is configured to provide a user interface allowing a user to select at least one item from the plurality of items, and in response to the user making a selection, generate edited information comprising the at least one selected item and transmit the edited information to the processing circuit, wherein the processing circuit is configured to receive the edited information from the electronic device, determine at least one item to be displayed among the items according to the edited information, generate a barcode according to the at least one item to be displayed, and control the e-paper display to display the barcode.

2. The electronic identification card of claim 1, wherein the authentication process comprises:

transmitting, by the security chip, a certificate request message to the electronic device;

transmitting, by the electronic device, a certificate to the security chip; and determining, by the security chip, if the certificate is correct, determining that the authentication process is passed if yes, and otherwise determining that the authentication process is not passed.

3. The electronic identification card of claim 1, wherein the barcode is configured to be scanned by a reading device to display an augmented reality object which comprises the at least one item to be displayed.

4. The electronic identification card of claim 1, wherein the items comprise name, address, identification number, or date of birth.

5. The electronic identification card of claim 1, wherein the security chip comprises a near field communication circuit.

6. An electronic identification system, comprising:

an electronic device; and an electronic identification card, comprising:

an e-paper display;

a security chip; and a processing circuit, electrically connected to the e-paper display and the security chip, and configured to receive a modification request from the electronic device and perform an authentication process, if the authentication process is passed, the security chip is configured to transmit identity information to the electronic device, wherein the identity information comprises a plurality of items, wherein in response to receiving the identity information, the electronic device is configured to provide a user interface allowing a user to select at least one item from the plurality of items, and in response to the user making a selection, the electronic device generates edited information comprising the at least one selected item, and transmits the edited information to the processing circuit, wherein the processing circuit is configured to determine at least one item to be displayed among the items according to the edited information, generate a barcode according to the at least one item to be displayed, and control the e-paper display to display the barcode.

7. The electronic identification system of claim 6, wherein the authentication process comprises:

transmitting, by the security chip, a certificate request message to the electronic device;

transmitting, by the electronic device, a certificate to the security chip; and determining, by the security chip, if the certificate is correct, determining that the authentication process is passed if yes, and otherwise determining that the authentication process is not passed.

8. The electronic identification system of claim 6, further comprising:

a reading device configured to scan the barcode on the e-paper display and display an augmented reality object, wherein the augmented reality object comprises the at least one item to be displayed.

9. The electronic identification system of claim 6, wherein the items comprise name, address, identification number, or date of birth.

10. The electronic identification system of claim 6, wherein the security chip comprises a near field communication circuit.

11. A method for an electronic identification card, the method comprising:

receiving, by a processing circuit, a modification request from an electronic device and performing an authentication process;

if the authentication process is passed, transmitting, by a security chip, identity information to the electronic device, wherein the identity information comprises a plurality of items;

in response to receiving the identity information, providing, by the electronic device, a user interface allowing a user to select at least one item from the plurality of items;

in response to the user making a selection, generating, by the electronic device, edited information comprising the at least one selected item, and transmitting the edited information to the processing circuit; and determining, by the processing circuit, at least one item to be displayed among the items according to the edited information, generating a barcode according to the at least one item to be displayed, and controlling an e-paper display to display the barcode.

12. The method of claim 11, wherein the authentication process comprises:

transmitting, by the security chip, a certificate request message to the electronic device;

transmitting, by the electronic device, a certificate to the security chip; and determining, by the security chip, if the certificate is correct, determining that the authentication process is passed if yes, and otherwise determining that the authentication process is not passed.

13. The method of claim 11, further comprising:

scanning, by a reading device, the barcode to display an augmented reality object which comprises the at least one item to be displayed.

14. The method of claim 11, wherein the items comprise name, address, identification number, or date of birth.

15. The method of claim 11, wherein the security chip comprises a near field communication circuit.

* * * * *